No. 759,712. PATENTED MAY 10, 1904.
E. HOEY.
AUTOMATIC CUT-OFF.
APPLICATION FILED JAN. 27, 1904.
NO MODEL.
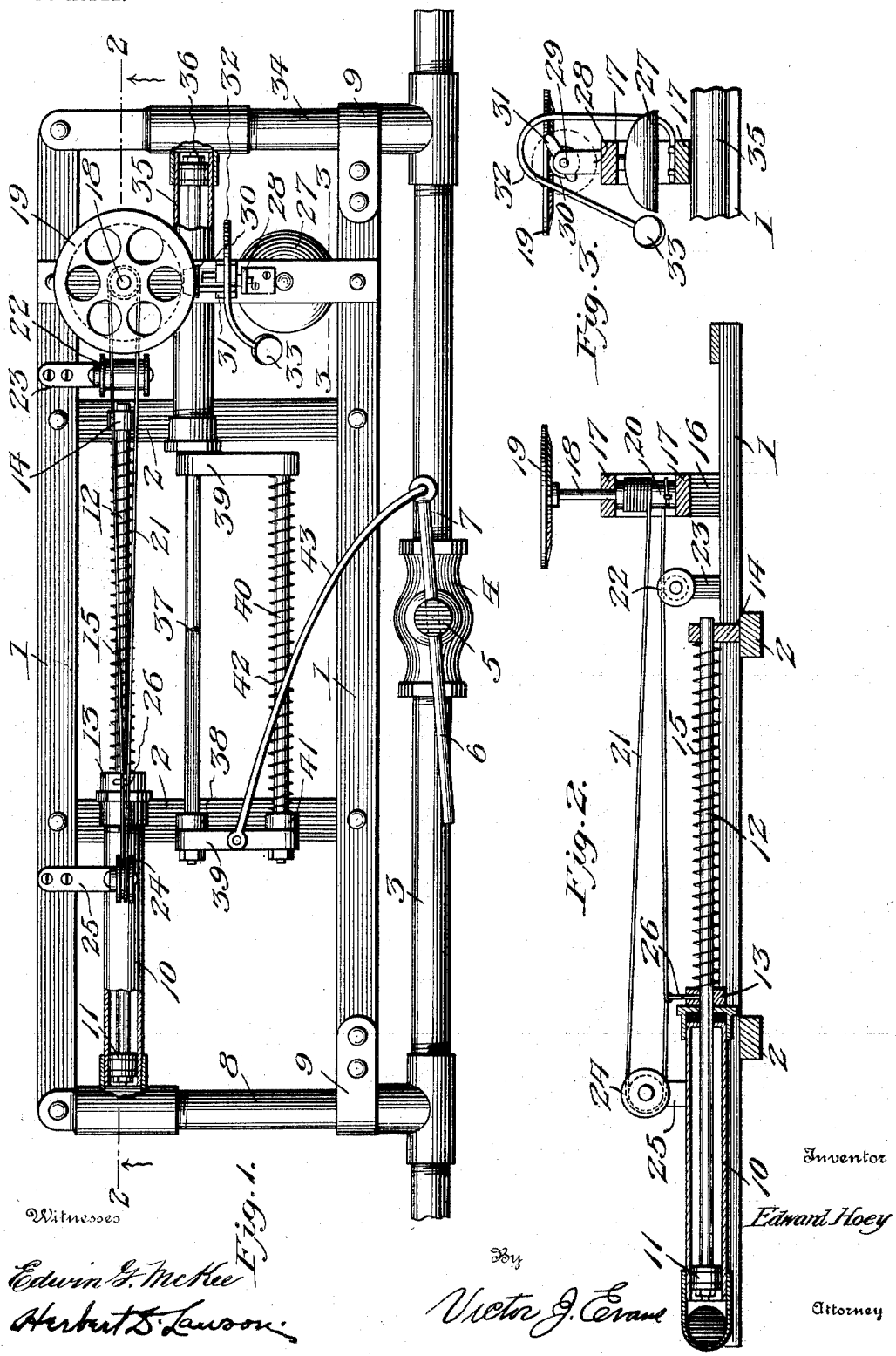
Witnesses
Edwin G. McKee
Herbert D. Lawson
Inventor
Edward Hoey
By
Victor J. Evans
Attorney No. 759,712. Patented May 10, 1904.

UNITED STATES PATENT OFFICE.

EDWARD HOEY, OF CANAL FULTON, OHIO.

AUTOMATIC CUT-OFF.

SPECIFICATION forming part of Letters Patent No. 759,712, dated May 10, 1904.

Application filed January 27, 1904. Serial No. 190,843. (No model.)

*To all whom it may concern:*

Be it known that I, EDWARD HOEY, a citizen of the United States, residing at Canal Fulton, in the county of Stark and State of Ohio, have invented new and useful Improvements in Automatic Cut-Offs, of which the following is a specification.

My invention relates to new and useful improvements in automatic cut-offs especially adapted for use in gas-pipes; and its object is to provide a device of this character which will automatically close the valve within a pipe as soon as pressure is removed as a result of the shutting off of the supply or damage to the pipe.

Another object is to provide an alarm adapted to be sounded when the flow of gas is shut off and also when gas is resupplied to the pipe to which the apparatus is connected.

With the above and other objects in view the invention consists of a valve which is connected to and is adapted to be operated by a spring-pressed rod extending from a piston which is mounted in a cylinder communicating with the supply-pipe at one side of the valve. Another cylinder communicates with said pipe at the other side of the valve and has a spring-pressed piston therein which is connected to alarm mechanism, whereby an alarm is sounded whenever the supply of gas is cut off or turned on. One of the great difficulties heretofore experienced in the use of gas for illuminating or other purposes has been the danger resulting from the accidental stoppage of the flow of gas and the subsequent readmission of the gas to the pipes. Unless some safety appliance is employed or some person is adjacent a burner when the lights are extinguished the gas will escape into the surrounding atmosphere when it is resupplied to the burner, and therefore serious accidents—such as asphyxiations, explosions, &c.—are liable to occur. By providing a device such as herein described the above dangers are prevented and the gas is cut off from the burners controlled by the valve whenever the gas-pressure is removed, and this valve cannot be opened except manually.

In the accompanying drawings I have shown the preferred form of my invention.

In the drawings, Figure 1 is a plan view of my improved valve attachment, the same being shown partly in section. Fig. 2 is a section on line 2 2, Fig. 1; and Fig. 3 is a section on line 3 3, Fig. 1.

Referring to the figures by numerals of reference, 1 1 are parallel side rails connected by cross-bars 2, forming the frame of the safety attachment. Extending along one side of this frame is a supply-pipe 3, having a valve 4 therein, the stem 5 of which has oppositely-extending arms 6 and 7 projecting laterally therefrom. A branch pipe 8 extends from the supply-pipe 3 at one side of valve 4 and is secured to the rails 1 by straps 9 or in any other suitable manner. A cylinder 10 extends from and communicates with the interior of the pipe 8 and has a piston 11 slidably mounted therein. Extending from this piston is a rod 12, having a collar 13 secured thereto, and the rod 12 is slidably mounted within a guide 14, extending from one of the cross-bars 1. A spring 15 is arranged on the rod 12 and bears at opposite ends on collar 13 and guide 14 and serves to hold the collar normally in contact with the outer end of cylinder 10. Standards 16 are secured to the side rails and support cross-strips 17, in which is journaled a shaft 18, having a gear 19 at one end. A drum 20 is secured to and rotates with the shaft, and the ends of a cord 21 are secured to this drum and wound thereon in opposite directions. Cord 21 is supported near the drum by a roller 22, journaled upon a bracket 23, and another roller 24 is journaled on a bracket 25 at one side of cylinder 10, and the cord 21 extends therearound. The cord is secured to a pin 26, extending from the collar 13, and it will therefore be seen that when the rod 12 is reciprocated the ends of the cord will be wound and unwound, respectively, on the drum and will cause the shaft 18 to rotate in opposite directions alternately. A bell 27 is secured to one of the cross-strips 17, and journaled within a bracket 28 at a point above the bell is a shaft 29, on which is secured a gear 30, which meshes with the gear 19, before referred to. A trip 31 extends from the shaft and rotates therewith and is adapted to contact with and impart lateral movement to a curved spring-stem 32, which is secured to one of the cross-strips 17 and has a clapper 33 at its free end adapted to strike the bell 27.

A branch pipe 34 extends laterally from supply-pipe 3 at the side of valve 4 removed from the pipe 8, and a cylinder 35 extends from this branch pipe and communciates therewith. A piston 36 is slidably mounted within the cylinder and has a rod 37, which is slidably mounted in a guide 38, provided therefor. Cross-heads 39 are secured to the rod 37 and are connected by a guide-rod 40, slidably mounted within a guide 41, provided therefor. A coiled spring 42 incloses rod 40 and bears at opposite ends upon the guide 41 and one of the cross-heads 39, and a rod 43 connects the outer cross-head 39 with arm 7 of valve-stem 5.

When it is desired to open the valve 4, the stem 5 is rotated manually by means of the arm 6. Arm 7 and rod 43 will press against the cross-head 39 and will slide the rods 37 and 40 within their guides and compress spring 42. As soon as the gas passes through the valve 4 it will flow into the branch pipe 34, and cylinder 35 will press against piston 36 and hold it in the position to which it is moved when the valve is opened. Should the flow of gas within pipe 3 be stopped for any reason, the pressure upon piston 36 will be promptly removed, and spring 43 will return the rods 37 and 40 and the piston 36 to their normal positions and rod 43 will close the valve 4. At the same time the pressure of gas through the pipe 8 and in cylinder 10 will be removed, and the spring 15, which is normally compressed, will slide the piston longitudinally within the cylinder and toward the pipe 8. As the cord 21 is secured to the movable collar 13, it will be understood that as this piston moves longitudinally one end of the cord will be unwound from the drum 20, while the other end will be wound thereon, gear 19 will be rotated, as will gear 30, and trip 31 will be brought into contact with the stem 32 and spring the clapper 33 into contact with the bell 27. This bell will therefore indicate when the supply of gas has been shut off. Should the gas be readmitted to the pipe 3, it cannot pass to the pipe 34, because valve 4 is closed. It can, however, pass into branch pipe 8 and will force the piston 11 longitudinally within its cylinder and compress the spring 15. This movement of its piston and its rod 12 will again rotate the drum 20 and cause the alarm to be sounded, thus notifying persons of the fact that the supply has been turned on. The valve can then be reopened, as hereinbefore described.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a valved supply-pipe; of cylinders communicating with the supply-pipe at opposite sides of the valve, a piston within each cylinder, mechanism operated by one of the pistons for closing the valve when pressure is removed from the piston, and mechanism connected to the other piston for operating an alarm when pressure is removed from the piston.

2. In a device of the character described, the combination with a valved supply-pipe; of a cylinder communicating with said pipe, a spring-pressed piston therein adapted to be operated when pressure is applied thereto or removed therefrom, a revoluble drum, means for transmitting rotary motion thereto from the piston, a gear revoluble with the drum, a revoluble trip operated by the gear, and means operated by the trip for sounding an alarm.

3. In a device of the character described, the combination with a valved supply-pipe; of cylinders communicating with said pipe at opposite sides of the valve, pistons within the cylinder, alarm mechanism adapted to be operated by one of the pistons when pressure is applied to or removed from the piston, a spring-controlled rod extending from the other piston, and a rigid connection between said rod and the valve.

4. In a device of the character described, the combination with a valved supply-pipe; of cylinders communicating with said pipe at opposite sides of the valve, pistons within the cylinder, alarm mechanism adapted to be operated by one of the pistons when pressure is applied to or removed from the piston, a spring-controlled rod extending from the other piston, a cross-head secured to the rod, a guide-rod secured to the cross-head, and a rod connecting the cross-head and the valve.

In testimony whereof I affix my signature in presence of two witnesses.

EDWARD HOEY.

Witnesses:
J. J. ARBAUGH,
C. R. DAILY.